US009917820B1

(12) United States Patent
Kolman et al.

(10) Patent No.: US 9,917,820 B1
(45) Date of Patent: Mar. 13, 2018

(54) SECURE INFORMATION SHARING

(71) Applicant: EMC IP Holding Company LLC, Hopkinton, MA (US)

(72) Inventors: Eyal Kolman, Tel Aviv (IL); Alon Kaufman, Herut (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 136 days.

(21) Appl. No.: 14/753,443

(22) Filed: Jun. 29, 2015

(51) Int. Cl.
G06F 21/62 (2013.01)
H04L 29/06 (2006.01)
G06F 17/30 (2006.01)

(52) U.S. Cl.
CPC .... H04L 63/0471 (2013.01); G06F 17/30545 (2013.01); G06F 21/6218 (2013.01)

(58) Field of Classification Search
CPC combination set(s) only.
See application file for complete search history.

(56) References Cited

U.S. PATENT DOCUMENTS

| 6,732,105 | B1* | 5/2004 | Watson, Jr. | G06F 21/31 |
| 7,107,445 | B2 | 9/2006 | Trapp et al. | |
| 7,584,223 | B1* | 9/2009 | Pinkas | G06Q 30/02 |
| 7,664,806 | B1* | 2/2010 | Koudas | G06F 17/30545 |
| | | | | 707/899 |
| 7,856,100 | B2 | 12/2010 | Wang et al. | |
| 8,010,782 | B2 | 8/2011 | Kerschbaum | |
| 8,281,148 | B2 | 10/2012 | Tuyls et al. | |
| 8,533,489 | B2* | 9/2013 | Roeder | G06F 17/30619 |
| | | | | 380/255 |
| 8,832,427 | B2* | 9/2014 | Roeder | H04L 9/0894 |
| | | | | 713/150 |
| 8,862,895 | B2 | 10/2014 | Rieffel et al. | |
| 8,925,075 | B2 | 12/2014 | Krendelev | |
| 9,191,196 | B2 | 11/2015 | Raykova et al. | |
| 9,197,637 | B2 | 11/2015 | Sy et al. | |
| 9,215,219 | B1 | 12/2015 | Krendelev et al. | |
| 9,276,734 | B2 | 3/2016 | Naganuma | |
| 9,281,941 | B2* | 3/2016 | Gentry | H04L 9/008 |

(Continued)

OTHER PUBLICATIONS

Hosseinkhani (Hosseinkhani et al., "Using Cipher Key to Generate Dynamic S-Box in AES Cipher System", International Journal of Computer Science and Security (IJCSS), vol. (6) : Issue (1) : 2012).*

(Continued)

Primary Examiner — Peter Poltorak
(74) Attorney, Agent, or Firm — BainwoodHuang

(57) ABSTRACT

Techniques of information sharing involve processing queries from exchanges with multiple, non-colluding servers. Along these lines, each server stores a share of the query data such that readable query data may be reproduced only through combining the shares stored on a minimum number of the servers. In addition, a client wishing to submit a query encrypts any query input as well as a query function that provides an answer to the query. The client then sends a portion of the garbled query function to each of the servers. Each of the servers then evaluates their respective portion of the garbled query function using Yao's protocol in a serial manner so that one of the servers produces a garbled output. The client then determines the answer to the query by decoding the garbled output.

18 Claims, 5 Drawing Sheets

(56) References Cited

U.S. PATENT DOCUMENTS

| | | | |
|---|---|---|---|
| 2002/0104002 A1* | 8/2002 | Nishizawa | H04L 63/0428 713/168 |
| 2003/0074352 A1* | 4/2003 | Raboczi | G06F 17/30545 |
| 2004/0243816 A1* | 12/2004 | Hacigumus | G06F 17/30471 713/193 |
| 2007/0005594 A1* | 1/2007 | Pinkas | G06F 21/6263 |
| 2008/0183656 A1* | 7/2008 | Perng | G06F 17/30286 |
| 2008/0263006 A1* | 10/2008 | Wolber | G06F 17/30545 |
| 2009/0138698 A1* | 5/2009 | Chang | G06F 21/6218 713/150 |
| 2011/0110525 A1* | 5/2011 | Gentry | H04L 9/0822 380/285 |
| 2011/0194691 A1* | 8/2011 | Rane | H04L 9/008 380/255 |
| 2012/0054146 A1* | 3/2012 | Gupta | G06F 17/30545 707/602 |
| 2012/0079602 A1* | 3/2012 | Kolesnikov | H04L 9/0662 726/26 |
| 2013/0097417 A1 | 4/2013 | Lauter et al. | |
| 2013/0254085 A1* | 9/2013 | Tanimoto | G06Q 40/04 705/37 |
| 2013/0254532 A1 | 9/2013 | Raykova et al. | |
| 2014/0040620 A1* | 2/2014 | Kolesnikov | G09C 1/00 713/171 |
| 2014/0114994 A1* | 4/2014 | Lindblad | G06F 17/30545 707/756 |
| 2014/0156638 A1* | 6/2014 | Joshi | G06F 17/30566 707/722 |
| 2015/0007258 A1* | 1/2015 | Patey | H04L 9/00 726/1 |
| 2015/0244517 A1 | 8/2015 | Nita | |

OTHER PUBLICATIONS

Lindell, Y. and Pinkas B., "Secure Multiparty Computation for Privacy-Preserving Data Mining" (May 6, 2008) [retrieved on May 3, 2017]. Cryptology ePrint Archive [online]. Retrieved from Internet <URL: http://eprint.iacr.org/2008/197.pdf>.

Eyal Kolman; "Secure Fraud Detection"; U.S. Appl. No. 14/753,432, filed Jun. 29, 2015.

Eyal Kolman; "Secure Data Analytics"; U.S. Appl. No. 14/753,453, filed Jun. 29, 2015.

Eyal Kolman; "Secure Impersonation Detection"; U.S. Appl. No. 14/753,458, filed Jun. 29, 2015.

* cited by examiner

SECURE INFORMATION SHARING

BACKGROUND

Conventional information sharing networks allow subscribers of the network to share learned information with other subscribers. For example, suppose that a bank that subscribes to an information sharing network experiences an attack on its servers (e.g., a DDoS attack). The bank may discover that malicious communications used in the attack originated from certain IP addresses. The bank may then choose to upload these IP addresses to a database server within the information sharing network. In this way, other subscribers of the network may learn about the danger posed by communications from these IP addresses without suffering an attack.

Subscribers of conventional information sharing network acquire information provided to the network by other subscribers by submitting queries to the database server within the network. For example, suppose that another bank that subscribes to the network receives a suspicious communication originating from an IP address. That bank may submit a query to see if that IP address is known to be involved in malicious activity.

SUMMARY

Unfortunately, there are deficiencies with the above-described conventional information sharing networks. For example, there are potential liabilities that come with receiving sensitive information such as IP addresses in raw form. Along these lines, some clients of a third party service such as an information sharing network would rather not send sensitive information in raw form. Further, certain regulations prohibit the export of such sensitive information to third parties. One way to address this issue is to have a client of the third party service encrypt the sensitive information before sending it to the third party service. However, while this might satisfy the regulations, a conventional information sharing network may not be able to process queries based on encrypted information.

In contrast to the conventional information sharing networks that either may expose sensitive data or be unable to process queries based on encrypted information, improved techniques of information sharing involve processing queries from exchanges with multiple, non-colluding servers. Along these lines, each server stores a share of the query data such that readable query data may be reproduced only through combining the shares stored on a minimum number of the servers. In addition, a client wishing to submit a query garbles any query input as well as a query function that provides an answer to the query. The client then sends a portion of the garbled query function to each of the servers. Each of the servers then evaluates their respective portion of the garbled query function using Yao's protocol in a serial manner so that one of the servers produces a garbled output. The client then determines the answer to the query by decoding the garbled output.

Advantageously, the improved techniques provide secure information sharing such that no one server knows any of the data in a blacklist. Moreover, no server can determine any data contained in a query or even the query function being carried out. In this way, regulations regarding the exchange of sensitive data with a third party are satisfied. Further, the improved techniques provide improved communal blacklists because more entities are willing to share the sensitive data that makes such communal blacklists effective weapons against fraudulent web traffic.

One embodiment of the improved techniques is directed to a method of performing a query. The method includes generating, by processing circuitry, garbled query logic from a query function and query input. The method also includes performing, by the processing circuitry, a set of exchanges with a set of server computers which to process the garbled query logic with garbled query data that the set of server computers acquired from a set of query data sources that produced the garbled query data from readable query data, the set of server computers being obscured from deriving the query function and the query input from the garbled query logic, and the set of server computers being obscured from deriving the readable query data from the garbled query data. The method further includes obtaining, by the processing circuitry, a query result from the set of exchanges performed with the set of server computers.

Additionally, some embodiments are directed to an apparatus constructed and arranged to perform a query. The apparatus includes a network interface, memory and controlling circuitry coupled to the memory. The controlling circuitry is constructed and arranged to carry out a method of performing a query.

Further, some embodiments are directed to a computer program product having a non-transitory, computer-readable storage medium which stores executable code, which when executed by a controlling circuitry, causes the controlling circuitry to perform a method of performing a query.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of information sharing involve processing queries from exchanges with multiple, non-colluding servers. Along these lines, each server stores a share of the query data such that readable query data may be reproduced only through combining the shares stored on a minimum number of the servers. In addition, a client wishing to submit a query garbles any query input as well as a query function that provides an answer to the query. The client then sends a portion of the garbled query function to each of the servers. Each of the servers then evaluates their respective portion of the garbled query function using Yao's protocol in a serial manner so that one of the servers produces a garbled output. The client then determines the answer to the query by decoding the garbled output.

Advantageously, the improved techniques provide secure information sharing such that no one server knows any of the data in a blacklist. Moreover, no server can determine any data contained in a query or even the query function being carried out. In this way, regulations regarding the exchange of sensitive data with a third party are satisfied.

Figure 1:
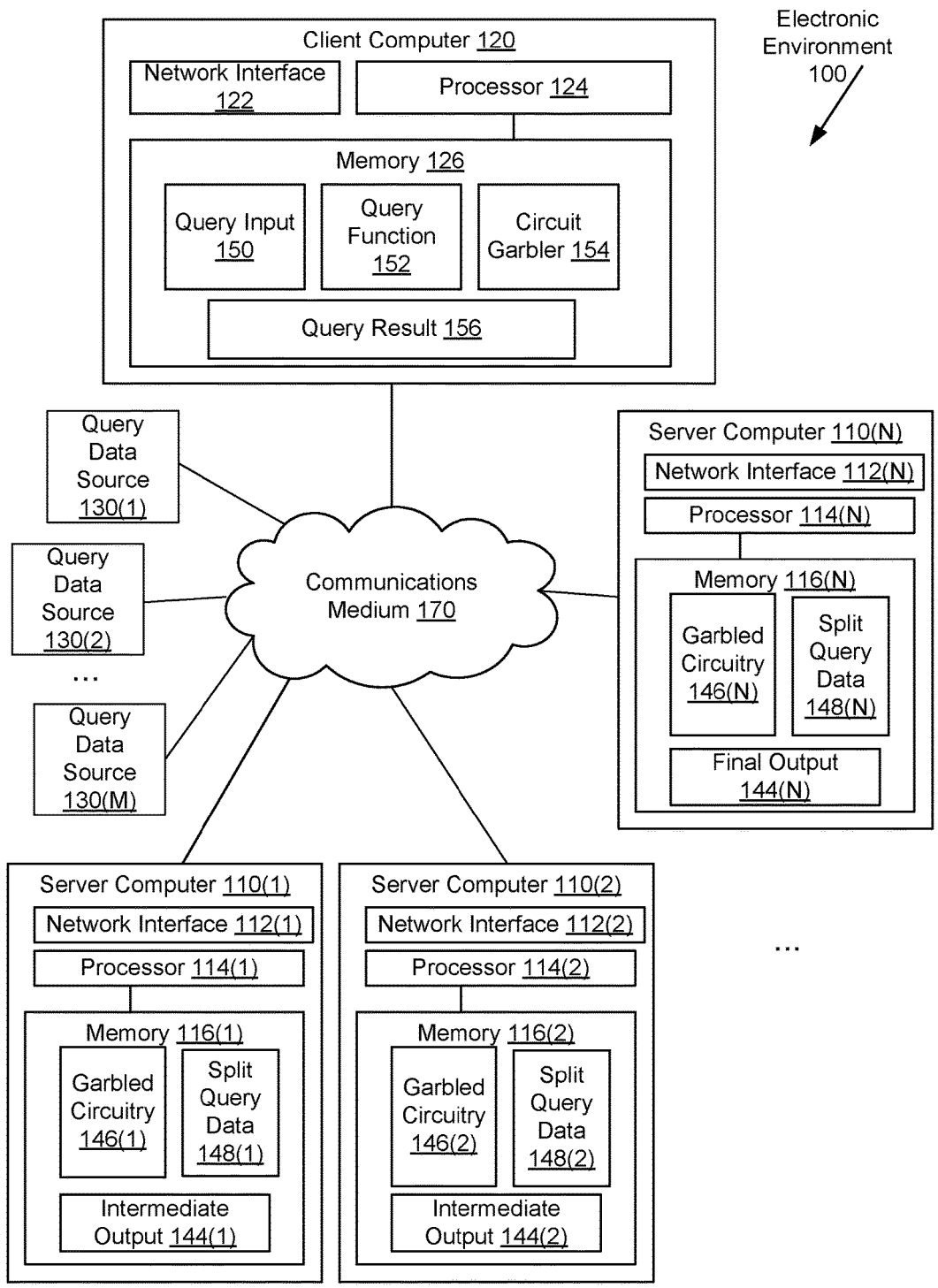
FIG. 1 is a block diagram illustrating an example electronic environment in which the improved technique can be carried out.

FIG. 1 shows an example electronic environment 100 in which embodiments of the improved techniques hereof can be practiced. The electronic environment 100 includes a client computer 120, server computers 110(1), 110(2), ..., 110(N), query data sources 130(1), 130(2), ..., 130(M), and a communications medium 170.

The client computer 120 is constructed and arranged to submit a query to the server computers 110(1), 110(2), ..., 110(N) in a secure fashion. As illustrated in FIG. 1, the client computer 120 includes a network interface 122, a processor 124, and memory 126. The network interface 122 includes, for example, adapters, such as SCSI target adapters and network interface adapters, for converting electronic and/or optical signals received from the communications medium 170 to electronic form for use by the client computer 120. The processor 124 includes one or more processing chips and/or assemblies. In a particular example, the processor 124 includes multi-core CPUs. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is also constructed and arranged to store various data, for example, query input 150, query function 152, and query result 156. The memory 126 is further constructed and arranged to store a variety of software constructs realized in the form of executable instructions, such as circuit garbler 154. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The circuit garbler 154 represents the query function 152 as a set of logic gates and garbles the circuits by rearranging entries of the truth tables representing the gates to produce the garbled circuitry 146(1), 146(2), ..., 146(N). For example, when the query function 152 involves a lookup in a blacklist, the query function 152 then includes a test for equality that may be expressed in terms of inverted XOR gates. The circuit garbler 154 replaces the truth tables of the inverted XOR gates with 128-bit binary strings and rearranges the order of the entries of the truth tables to disguise the nature of the logic gate presented to the server computers 110(1), ..., 110(N). The server computers 110(1), ..., 110(N) may then evaluate the respective garbled circuitry 146(1), 146(2), ..., 146(N) according to Yao's protocol.

Each server computer 110 is constructed and arranged to store large amounts of encrypted data representing previous access requests and to provide a risk model that enables computation of risk scores according to the previous access request data. For example, each server computer 110 may be part of a family of servers operated by third party security entity such as EMC, Inc. of Hopkinton, Mass. As illustrated in FIG. 1, each server computer 110 includes a respective network interface 112, a processor 114, and memory 116. The network interface 112 includes, for example, adapters, such as SCSI target adapters and network interface adapters, for converting electronic and/or optical signals received from the communications medium 170 to electronic form for use by that server computer 110. Each respective processor 114 includes one or more processing chips and/or assemblies. In a particular example, the respective processor 114 includes multi-core CPUs. The memory 116 includes both volatile memory (e.g., RAM), and non-volatile memory, such as one or more ROMs, disk drives, solid state drives, and the like. The respective processor 114 and the corresponding memory 116 together form control circuitry, which is constructed and arranged to carry out various functions as described herein.

Each memory 116 is also constructed and arranged to store various data, for example, respective split query data 148 and intermediate output 144 resulting from the evaluation of the respective garbled circuitry 146. Each memory 116 is also constructed and arranged to store a variety of software constructs realized in the form of executable instructions, such as respective garbled circuitry 146. When the executable instructions are run by the processor 114, the processor 114 is caused to carry out the operations of the software constructs. Although certain software constructs are specifically shown and described, it should be understood that the memory 114 typically includes many other software constructs, which are not shown, such as an operating system, various applications, processes, and daemons, for example.

The garbled circuitry 146(1), ..., 146(N) represents respective instructions to carry out query operations according to the query function 152 generated by the client computer 120. The evaluation of the each garbled circuitry 146 is performed according to Yao's protocol. Each garbled circuitry 146 takes the form of logic gates having input and output wires. The logic gates in turn are represented by truth tables that map possible binary values of the input wires to possible binary values of the output wire. The circuitry 146 is garbled because the possible binary values encapsulated in the truth tables of the logic gates are replaced with random binary strings of a fixed length (e.g., 128 bits) and the order of the entries of the truth tables scrambled so that the servers 110 do not know what any particular truth table represents.

Each query data source 130(1), 130(2), ..., 130(M) is any electronic device capable of storing raw query data and splitting the raw query data into shares to be stored on each of the server computers 110.

The communications medium 170 provides network connections among the client computer 120, the server computers 120(1), ..., 120(N), and the query data sources 130(1), ..., 130(M). It should be understood, however, that no communication is to take place among the server computers 120(1), ..., 120(N). Communications medium 170 may implement any of a variety of protocols and topologies that are in common use for communications over the Internet. Furthermore, communications medium 170 may include various components (e.g., cables, switches/routers, gateways/bridges, etc.) that are used in such communications.

During operation, each of the query data sources 130(1), ..., 130(M) splits readable data into N shares to be stored on each server computer 120(1), ..., 120(N). Such splitting and storing of shared data occurs on a continual basis in the background. Each query data source 130 may perform the splitting by generating random bit strings that, when combined through bitwise XOR operations, produce the readable data.

At some point, the client computer 120 formulates a query in response to observing suspicious behavior on a network. In one example, the query may simply be a lookup of a particular IP address in the communal blacklist. In another example, the query may involve asking which IP addresses were involved in the most queries over a previous window of time. In formulating the query, the client computer 120 generates or produces a mathematical query function 152 and a query value 150. Along these lines, in the case of the lookup in the blacklist, the mathematical function includes a test for equality, i.e., does the query value 150 equal any of the raw data values stored in the blacklist? In the case of producing a count for asking which IP addresses were involved in the most queries, the mathematical function may also include an adding component.

Once the client computer 120 formulates the query, the client computer transforms the mathematical query function 152 and the query input 150 to the query function 152 in the form of logic gates. In doing so, the client computer 120 garbles the query input so that no server computer 110 may learn the value of the query input 150. The client computer also 120 garbles the logic gates using circuit garbler 154 as described above and produces garbled circuitry 146(1), . . . , 146(N) for each of the server computers 110(1), . . . , 110(N). The client computer 120 then sends the garbled circuitry 146(1), . . . , 146(N) to the respective server computers 110(1), . . . , 110(N) in a serial fashion as follows.

The client computer 120 sends the garbled circuitry 146(1) with the garbled query input 150 to the server computer 110(1). Upon receiving its respective garbled circuitry 146(1), the server computer 110(1) generates an intermediate output 144(1) based on the split query data 144(1). It should be understood that, as part of Yao's protocol, the server computer 110(1) garbles at least a portion of the split query data 148(1) as input to the garbled circuitry 146(1) according to Yao's protocol to produce the intermediate output 144(1). The server computer 110(1) then sends the intermediate output 144(1) to the client computer 120. It should be understood that the intermediate output 144(1) is in garbled form and is meaningless to the server computer 110(1).

Upon receiving the intermediate output 144(1), the client computer 120 sends the garbled circuitry 146(2) and the intermediate output 144(1) to the server computer 120(2). Upon receiving its respective garbled circuitry 146(2), the server computer 110(2) generates an intermediate output 144(2) based on the split query data 148(2) and sends the intermediate output 144(2) to the client computer 120. The intermediate output 144(2) is in garbled form and is meaningless to the server computer 110(2).

The above serial process repeats over the rest of the server computers 110 until a final output 144(N) is generated by the server computer 110(N) from the garbled circuitry 146(N), an intermediate output 146(N-1), and the split query data 148(N). The final output is in garbled form and is meaningless to the server computer 110(N). The server computer 110(N) sends the final output 144(N) to the client computer 120. Upon receiving the final output 144(N). The client computer decrypts the final output 144(N) to produce the query result 156.

Figure 2:
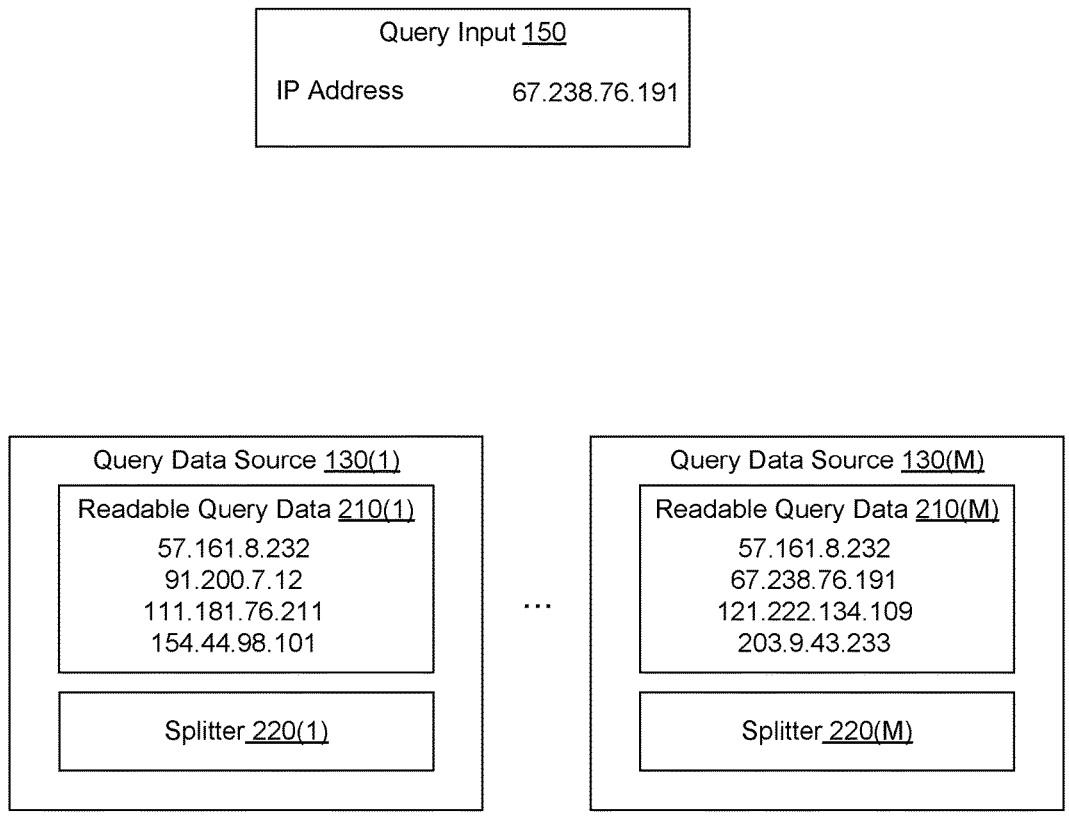
FIG. 2 is a block diagram illustrating an example query input and example readable query data within the electronic environment illustrated in FIG. 1.
Figure 3:
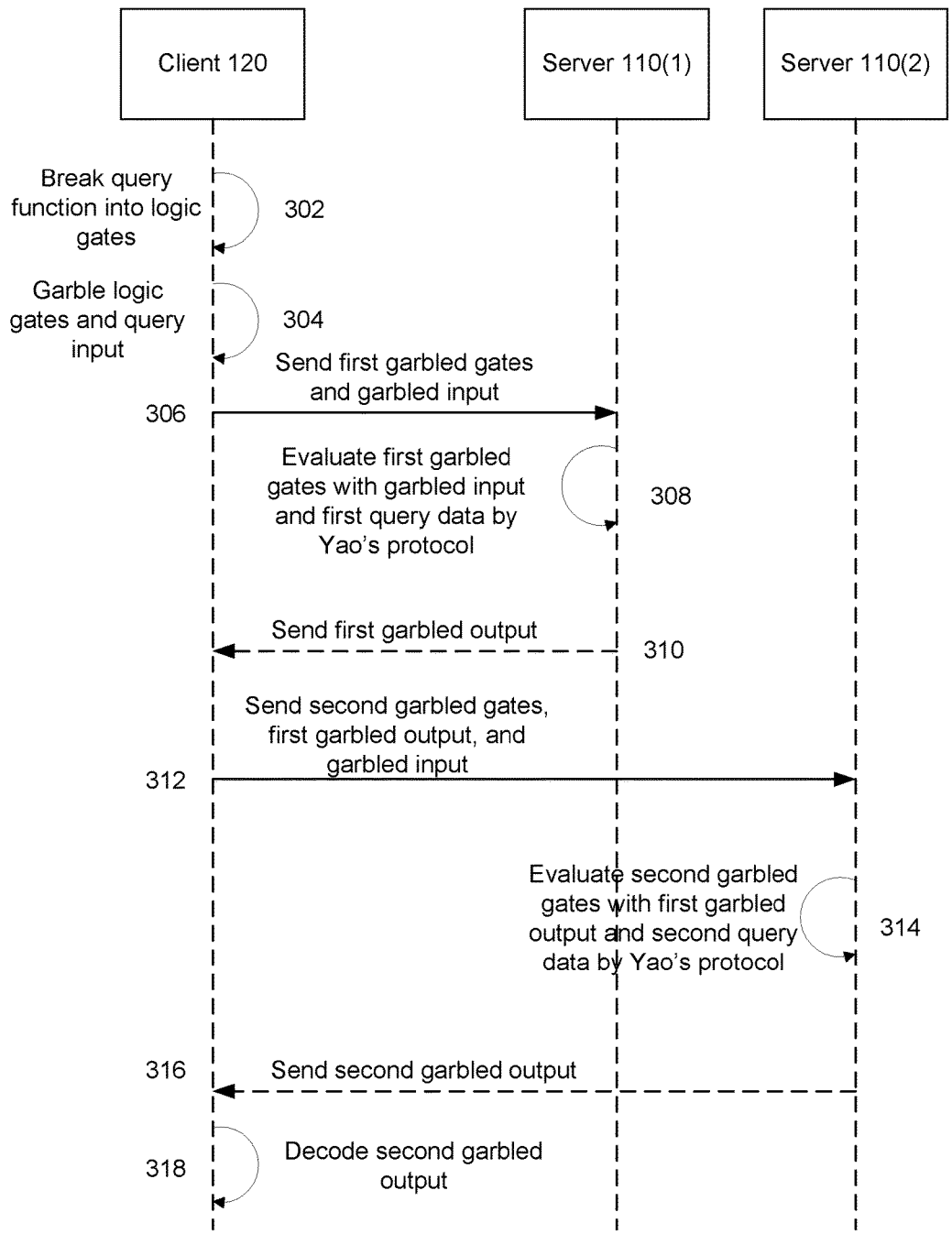
FIG. 3 is a sequence diagram illustrating an example query within the electronic environment illustrated in FIG. 1.
Figure 4:
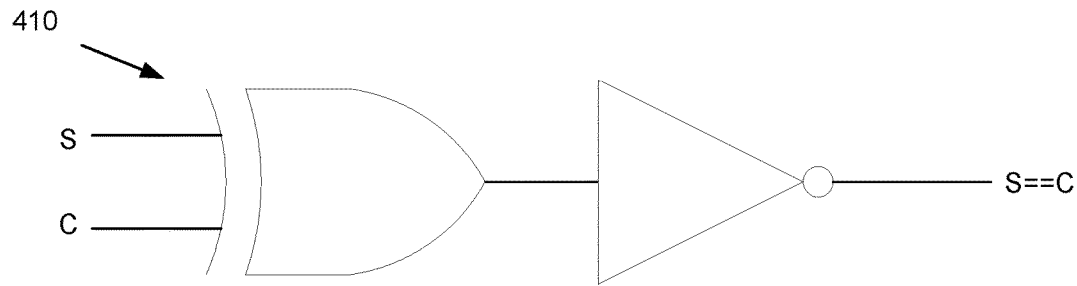
FIG. 4 is a block diagram illustrating an example circuit evaluation using Yao's protocol within the electronic environment illustrated in FIG. 1.

FIGS. 2, 3, and 4 provide a specific example of the above-described query fulfillment process. In particular, FIG. 2 illustrates a specific example of a query input 150 and query data. In this example, the data take the form of IP addresses that may or may not be associated with malicious activity on a network. Along these lines, the query input 150 as illustrated in FIG. 2 is a single IP address 67.238.76.191.

FIG. 2 also illustrates the readable query data 210(1), . . . , 210(M) as stored in the respective query data sources 130(1), . . . , 130(M). In this case, the readable data are also IP addresses. Note that in the specific case illustrated in FIG. 2, there is an IP address repeated over different data sources 210 and there is a match between an IP address on data source 210(M) and the query input 150.

As illustrated in FIG. 2, each of the query data sources 130(1), . . . , 130(M) has a respective splitter 220(1), . . . , 220(M) that splits each query datum into N shares to be stored on respective server computers 110(1), . . . , 110(N). In a typical arrangement but by no means required, each splitter 220 splits each query datum 210 into N shares according to a random number generation algorithm such that a bitwise XOR operation applied to the shares produces that query datum 210. It should be understood that such a splitting is secure as long as the servers 110(1), . . . , 110(N) do not collude because each of the shares is meaningless in isolation.

FIG. 3 illustrates an example sequence diagram representing an example query process by which the client computer 120 and each of two server computers 110(1) and 110(2) combine to perform a query operation.

At 302, the client computer 120 formulates a query by specifying a query function 152 and query value 150. For example, suppose that the client computer 120 wishes to inquire whether the IP address shown in FIG. 2 as the query value 150 appears in a blacklist. In this case, the query function takes the form of a series of equality tests between the query value 150 and each of the query data values 210(1), . . . , 210(M). If there were no splitting, each equality test might be expressed in terms of inverted XOR gates for each bit of the query values under consideration.

However, because the query data is split in two among each of the server computers 110(1) and 110(2), the equality test involves slightly different operations. Consider a query datum having value x split into two shares $x_1$ and $x_2$ such that $$x = x_1 \oplus x_2,$$

where $\oplus$ denotes the XOR operator. Suppose that there is no garbling of the query input 150 or the query function 152. When the client computer 120 sends the server computer 110(1) a query value q, the server computer 110(1) generates the intermediate output $y_1 = q \oplus x_1$ and sends this intermediate output back to the client computer 120. The client computer 120 sends the intermediate output $y_1$ to the server computer 110(2). The server computer 110(2) then generates the final output $y_2 = \neg (y_1 \oplus x_2)$, where $\neg$ is the inversion operator, and sends the final output to the client computer 120. The client computer would then consider the final output $y_2$ as the query result 156. (The query result 156 in this case would be a Boolean TRUE or FALSE.)

However, at 304, the client computer 120 garbles the query input 150 and the query function 152. The garbling in this case is a replacement of each bit of the truth tables representing the logic gates (e.g., XOR gates) and the bits of the query input 150 with a respective 128-bit random binary string. As will be described in further detail below in connection with FIG. 4, each truth table has a server input and a client input. As each input may be either a 0 or a 1, there are four entries in a truth table. For each bit of the query input 150, each server 0 and 1 gets a respective binary string, each client 0 and 1 gets a respective binary string, and each output 0 and 1 gets a respective binary string. The client computer 120 alone may decrypt from this garbling scheme as the client computer 120 stores the binary strings corresponding to the possible output bits of each truth table. Further, the client computer 120 also garbles the truth tables by rearranging the order of the entries in a random fashion. In this way, each of the server computers 110(1) and 110(2) will not know what operation they are carrying out.

It should be understood that the breaking up of the query function 152 into logic gates involves forming a first set of truth tables to be sent to the server computer 110(1) and a second set of truth tables to be sent to the server computer 120(1). For the simple case of performing a lookup in a blacklist, the first set of truth tables may represent XOR gates and the second set of truth tables may represent inverted XOR gates for performing an equality test.

At 306, the client computer sends the first garbled truth tables with the garbled input 150 to the server computer 110(1).

At 308, the server computer 110(1) determines the first garbled output of the first garbled truth tables based on the split query data 148(1). In this case, the XOR operations represented by the truth tables are performed between corresponding bits. In order to accomplish this, each value has a fixed length of, say, 32 bits. Thus, there would be 32 XOR gates, i.e., garbled truth tables evaluated in parallel. The evaluation of the garbled truth tables is accomplished by using Yao's protocol. An example of Yao's protocol is described below in connection with FIG. 4.

At 310, the server computer 110(1) sends the first garbled output 144(1) to the client computer 120.

At 312, the client computer 120 sends the second set of garbled truth tables with the first garbled output 144(1) to the server computer 110(2).

At 314, the server computer 110(2) determines the second garbled output of the second garbled truth tables based on the split query data 148(2). In this case, the inverted XOR operations represented by the truth tables are performed between corresponding bits. In order to accomplish this, each value has a fixed length of, say, 32 bits. Thus, there would be 32 inverted XOR gates, i.e., garbled truth tables evaluated in parallel. The evaluation of the garbled truth tables is accomplished by using Yao's protocol. An example of Yao's protocol is described below in connection with FIG. 4.

At 316, the server computer 110(2) sends the second garbled output 148(2) to the client computer 120. The client computer 120 is aware that this output represents the final output for this query.

At 318, the server computer 120 decrypts the second garbled output 148(2) to produce the query result 156. In this case, the query result takes the form of a series of Boolean values represented by a bit string. If all of the bits are 0's, then the input query value did not appear in the blacklist. If at least one of the bits is a 1, then the input query valkue did appear on the blacklist.

It should be understood that there are many other possible query functions 152, each represented by respective sets of logic gates. Some examples of other query functions are as follows:

If an IP address exists, return an associated value of this IP (e.g., score, country, etc.).

Return this IP address only if it exists and an expiry date has not yet been reached.

Return the number of clients that uploaded this IP address.

Return the number of other clients queried this IP address over a previous time period. Such a time period may be 10, 30, 60, or 90 days, or any other number of hours, days, weeks, or months.

Return the IP addresses that were queried more than a specified number of times.

Return the top 5 (or 2, 10, 20, etc.) most queried IP addresses.

FIG. 4 illustrates a specific example of Yao's protocol of evaluating a garbled logic gate that is part of the overall garbled circuit 146. In particular, FIG. 4 shows an inverted XOR gate 410 used in equality tests that are a part of the query operation illustrated in FIGS. 2 and 3. Inverted XOR gate 410 has two input wires S and C for a server computer 110 and the client computer 120, respectively and an output wire that indicates whether the input wires S and C contain the same bit value. The inverted XOR gate 410 has a truth table 420.

As part of the garbling process, i.e., Yao's protocol, the server computer 120 replaces each possible bit of the server wire and the client wire with a respective randomly-generated, 128-bit binary string to form a garbled truth table 430. Specifically, the 128-bit representation of the 0 bit on the server wire is denoted as $w_0^S$, the 128-bit representation of the 1 bit on the server wire is denoted as $w_1^S$, the 128-bit representation of the 0 bit on the client wire is denoted as $w_0^C$, the 128-bit representation of the 1 bit on the client wire is denoted as $w_1^C$, the 128-bit representation of the 0 bit on the output wire is denoted as $w_0^O$, and the 128-bit representation of the 1 bit on the output wire is denoted as $w_0^O$.

Moreover, the server computer 120 encrypts the bit strings of the output wire $w_0^O$ and $w_1^O$ using a symmetric encryption scheme. The key associated with this scheme is a combination of the bit string of the server wire and the bit string of the client wire. That is, instead of two possible values on the output wire, there are four possible values corresponding to the four possible combinations of values of the server and client input wires.

The server computer 120 then randomly rearranges the rows of the encrypted truth table 430 to form the garbled truth table 440. In this way, the client computer 110 has no way to identify the logic gate from the table. Further, once the client computer 110 obtains its bit string for the client input wire, it may obtain the 128-bit string of the output wire without knowing the other bit strings on the output wire.

When the server computer 120 provides the the query function 152 to the client computer 110, the server computer 120 provides garbled truth tables such as garbled truth table 440. In addition, the server computer 120 provides the 128-bit string for each of its input wires.

The string that is input on the client wire is determined by oblivious transfer. The idea behind oblivious transfer is that the client computer 120 does not know which of the two possible bit strings the server computer 110 inputs on the client input wire and that the server computer 110 does not recognize the other possible input bit string. An example of oblivious transfer is as follows:

The client computer 120 generates (i) a key pair [d, (N, e)] and (ii) two random bit strings $x_0$ and $x_1$. The server computer 120 sends N, e, $x_0$, and $x_1$ to the server computer 110. The value d is a secret that the server computer 110 will not know.

The server computer 110 knows which binary value b it needs to input, which the client computer 120 will not know. The server computer 110 also generates a secret random number k. The server computer 110 generates the number $v=(x_b+k^e)$ mod N and sends v to the client computer 120.

The client computer 120 computes $k_0=(v-x_0)^d$ mod N and $k_1=(v-x_1)^d$ mod N, which will not be known to the client computer 110. The client computer 120 then computes $w_0^{C'}=w_0^C+k_0$ and $w_1^{C'}=w_1^C+k_1$ and sends $w_0^{C'}$ and $w_1^{C'}$ to the server computer 110.

The server computer 110 then reveals $w_b^C=w_b^{C'}-k$. The other string reveals nothing upon subtracting k, so the server computer 110 learns nothing about $w_{1-b}^C$. Meanwhile, the client computer 120 knows nothing about b.

For a complicated circuit, there will be many gates with one oblivious transfer per input. The oblivious transfer is the most computationally demanding part of the risk score computation because of the exponentiation operations. However, the oblivious transfers may be performed in parallel.

Once oblivious transfer has completed, the server computer 110 decrypts the value of the output wire using the given value of the server input wire and the obtained value of the client input wire as keys. The server computer 110 is only able to decrypt one of the possible values of the output wire, and the other three possible values will result in noise. One way that the client computer may recognize the correct output value by concatenating a string of 0's to each possible output value. The keys will decrypt the string of 0's as well only for the correct output wire value.

It should be understood that the server computer 110 still does not know what the binary value of the output wire of a gate actually is, but only the binary string representing that value. However, the server computer 110 may feed this new binary string as input into another gate.

Yao's protocol also demands that the number of rounds (typically 2-4) be constant. That is, the number of rounds should not depend on the size of the circuit, i.e., the number of gates.

Figure 5:
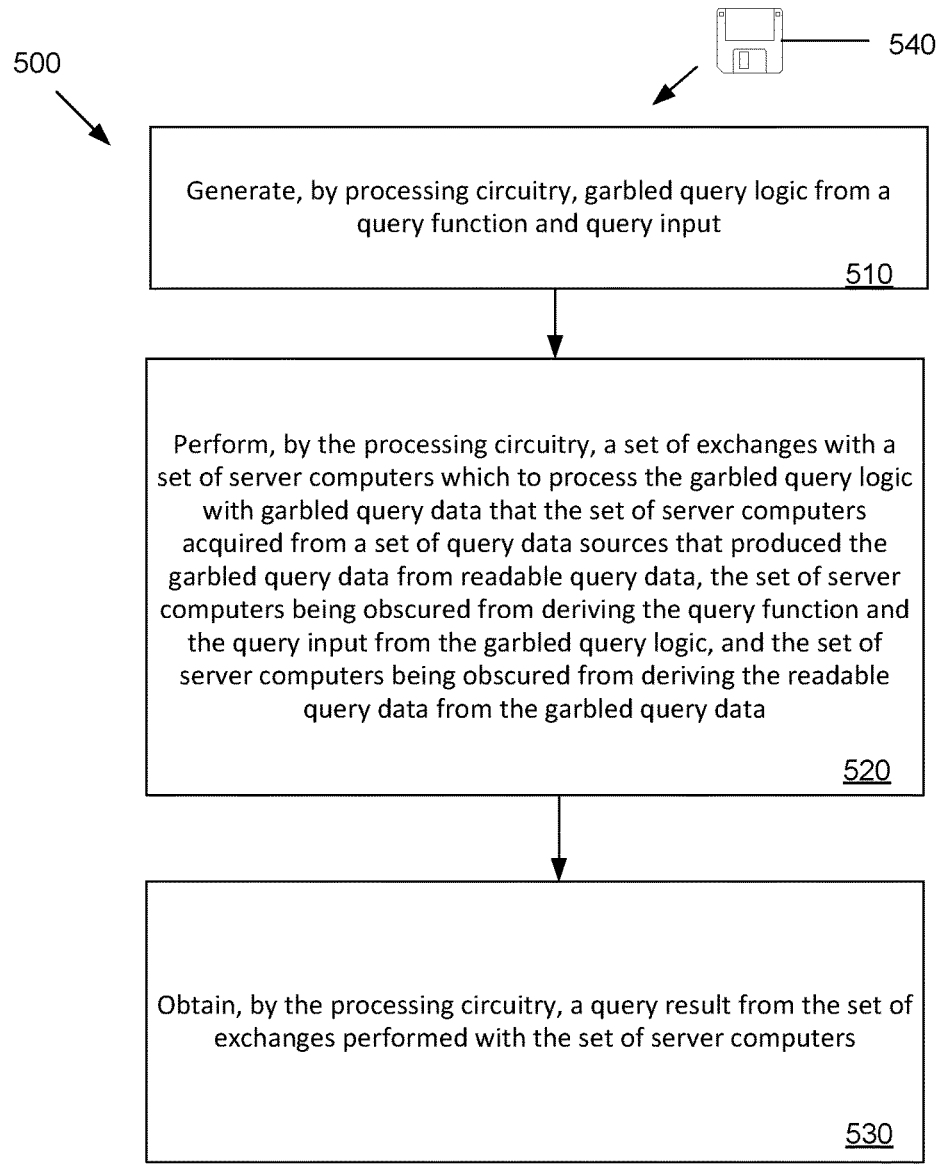
FIG. 5 is a flow chart illustrating a method of carrying out the improved technique within the electronic environment illustrated in FIG. 1.

FIG. 5 illustrates a method 500 of performing a query. The method 500 may be performed by the software constructs described in connection with FIG. 1, which reside in the memory 126 of the client computer 120 and the respective memory 116(1), . . . , 116(N) of the server computers 110(1), . . . , 110(N) and are respectively run by the processors 124 and 114(1), . . . , 114(N).

At 510, a client computer generates garbled query logic from a query function and query input.

At 520, the client computer performs a set of exchanges with a set of server computers which to process the garbled query logic with garbled query data that the set of server computers acquired from a set of query data sources that produced the garbled query data from readable query data, the set of server computers being obscured from deriving the query function and the query input from the garbled query logic, and the set of server computers being obscured from deriving the readable query data from the garbled query data.

At 530, the client computer obtains a query result from the set of exchanges performed with the set of server computers.

Improved techniques of of information sharing involve processing queries from exchanges with multiple, non-colluding servers. Along these lines, each server stores a share of the query data such that readable query data may be reproduced only through combining the shares stored on a minimum number of the servers. In addition, a client wishing to submit a query garbles any query input as well as a query function that provides an answer to the query. The client then sends a portion of the garbled query function to each of the servers. Each of the servers then evaluates their respective portion of the garbled query function using Yao's protocol in a serial manner so that one of the servers produces a garbled output. The client then determines the answer to the query by decoding the garbled output. Advantageously, the improved techniques provide secure information sharing such that no one server knows any of the data in a blacklist. Moreover, no server can determine any data contained in a query or even the query function being carried out. In this way, regulations regarding the exchange of sensitive data with a third party are satisfied.

Having described certain embodiments, numerous alternate embodiments or variations can be made. For example, it was assumed the client computer 120 generates the garbled truth tables and the server computers 110 evaluate the garbled truth tables. However, the situation may be reversed, with the server computers each generating garbled truth tables according to some set of query functions that might be performed and the client computer 120 evaluating the garbled truth tables in turn.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 540 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of performing a query, the method comprising:

generating, by processing circuitry, garbled query logic from a query function and query input;

performing, by the processing circuitry, a set of exchanges with a set of server computers which process the garbled query logic with garbled query data that the set of server computers acquired from a set of query data sources that produced the garbled query data from readable query data, the set of server computers being obscured from deriving the query function and the query input from the garbled query logic, and the set of server computers being obscured from deriving the readable query data from the garbled query data; and obtaining, by the processing circuitry, a query result from the set of exchanges performed with the set of server computers, wherein the set of server computers includes a first server computer and a second server computer, wherein generating the garbled query logic from the query function and the query input includes decomposing the Query function into a first query function and a second query function and encrypting the first query function, the second query function, and the query input according to a common encryption/decryption scheme to form, respectively, a garbled first query function, a garbled second query function, and a garbled query input, and wherein performing the set of exchanges with the set of server computers includes:

sending bits representing the garbled first query function and the garbled query input to the first server computer, receiving bits representing a first output from the first server computer, the first output being produced by the first server computer upon inputting the bits representing the garbled query input and bits representing first garbled query data into the primary query function, and sending bits representing the garbled second query function and the bits representing the first output to the second server computer.

2. A method as in claim 1, wherein obtaining the query result includes:

receiving bits representing a second output from the second computer, the second output being produced by the second server computer upon inputting the bits representing the first output and bits representing second garbled query data into the second query function, and decrypting the second output according to the common encryption/decryption scheme to form the query result.

3. A method as in claim 2, wherein decomposing the query function includes forming, as the first query function, a first set of truth tables and, as the second query function, a second set of truth tables;

wherein each of the first set of truth tables includes entries, each entry of that truth table including (i) a first server input bit value equal to one of two possible values of a bit representing the first garbled query data, (ii) a client input bit value equal to one of two possible values of a corresponding bit representing the garbled query input, and (iii) one of two possible values of a bit representing the first output; and wherein each of the second set of truth tables includes entries, each entry of that truth table including (i) a second server input bit value equal to one of two possible values of a bit representing the second garbled query data, (ii) a client input bit value equal to one of two possible values of a corresponding bit representing the first output, and (iii) one of two possible values of a bit representing the second output.

4. A method as in claim 3, wherein encrypting the first query function includes replacing the bit values of each entry of the first set of truth tables with a respective random binary string of a fixed length;

wherein encrypting the second query function includes replacing the bit values of each entry of the second set of truth tables with a respective random binary string of a fixed length; and wherein encrypting the query input includes replacing each of the bit values representing the query input with a respective random binary string of a fixed length.

5. A method as in claim 4, wherein encrypting the first query function further includes:

for each entry of a truth table of the first set of truth tables, performing a symmetric encryption operation on the possible values of the bit representing the first output, the symmetric encryption operation using, as keys, (i) the random binary string replacing the possible values of the bit representing the first garbled query data and (ii) the random binary string replacing the possible values of the bit representing the second garbled query data, and rearranging an order of the entries of the truth table to produce a garbled truth table.

6. A method as in claim 2, wherein a query data source of the set of query data sources decomposes the readable query data into first query data and second query data, a bitwise exclusive or operation applied to the first query data and the second query data producing the readable query data;

wherein decomposing the query function into the first query function and the second query function includes:

generating a first bitwise exclusive or function that takes as input (i) the query input and (ii) the first query data and produces an output that, when garbled, is the first output, and generating a second bitwise exclusive or function that takes as input (i) the output of the first query function and (ii) the second query data and produces the query result.

7. A method as in claim 6, wherein the readable query data includes a list of identifiers, the query input includes a particular identifier, and the query function includes a test for equality between the particular identifier and each of the list of identifiers; and wherein decrypting the second output according to the common encryption/decryption scheme to form the query result includes:

performing a decryption operation on the second output to produce a binary string having a length equal to a number of identifiers in the list of identifiers, and performing a Boolean operation on the binary string to produce a Boolean result that is TRUE in response to the binary string having at least one 1 and that is FALSE in response to the binary string having all 0's.

8. A method as in claim 6, wherein the readable query data includes a list of identifiers, the query input includes a null identifier, and the query function returns a most-queried identifier of the list of identifiers; and wherein decrypting the second output according to the common encryption/decryption scheme to form the query result includes performing a decryption operation on the second output to produce a binary string that reveals the most-queried identifier of the list of identifiers.

9. A method as in claim 1, wherein the processing circuitry resides within a client device, the client device being separate from the set of query data sources and the set of server computers, and wherein the garbled query data were acquired by the set of servers from the set of query data sources via an electronic communications medium.

10. A method as in claim 9, wherein the readable query data is not present within the client device while the processing circuitry performs the set of exchanges.

11. An electronic system constructed and arranged to perform a query, the electronic system comprising:
a set of server computers; and
a client computer including a network interface, memory, and controlling circuitry coupled to the memory, the controlling circuitry being constructed and arranged to:
generate, by processing circuitry, garbled query logic from a query function and query input;
perform, by the processing circuitry, a set of exchanges with a set of server computers which process the garbled query logic with garbled query data that the set of server computers acquired from a set of query data sources that produced the garbled query data from readable query data, the set of server computers being obscured from deriving the query function and the query input from the garbled query logic, and the set of server computers being obscured from deriving the readable query data from the garbled query data; and
obtain, by the processing circuitry, a query result from the set of exchanges performed with the set of server computers, wherein the set of server computers includes a first server computer and a second server computer,
wherein the controlling circuitry constructed and arranged to generate the garbled query logic from the query function and the query input is further constructed and arranged to:
decompose the query function into a first query function and a second query function, and
encrypt the first query function, the second query function, and the query input according to a common encryption/decryption scheme to form, respectively, a garbled first query function, a garbled second query function, and a garbled query input, and
wherein the controlling circuitry constructed and arranged to perform the set of exchanges with the set of server computers is further constructed and arranged to:
send bits representing the garbled first query function and the garbled query input to the first server computer,
receive bits representing a first output from the first server computer, the first output being produced by the first server computer upon inputting the bits representing the garbled query input and bits representing first garbled query data into the primary query function, and
send bits representing the garbled second query function and the bits representing the first output to the second server computer.

12. An electronic system as in claim 11, wherein the controlling circuitry constructed and arranged to obtain the query result is further constructed and arranged to:
receive bits representing a second output from the second computer, the second output being produced by the second server computer upon inputting the bits representing the first output and bits representing second garbled query data into the second query function, and
decrypt the second output according to the common encryption/decryption scheme to form the query result.

13. An electronic system as in claim 12, wherein the controlling circuitry constructed and arranged to decompose the query function is further constructed and arranged to form, as the first query function, a first set of truth tables and, as the second query function, a second set of truth tables;
wherein each of the first set of truth tables includes entries, each entry of that truth table including (i) a first server input bit value equal to one of two possible values of a bit representing the first garbled query data, (ii) a client input bit value equal to one of two possible values of a corresponding bit representing the garbled query input, and (iii) one of two possible values of a bit representing the first output; and
wherein each of the second set of truth tables includes entries, each entry of that truth table including (i) a second server input bit value equal to one of two possible values of a bit representing the second garbled query data, (ii) a client input bit value equal to one of two possible values of a corresponding bit representing the first output, and (iii) one of two possible values of a bit representing the second output.

14. An electronic system as in claim 13, wherein the controlling circuitry constructed and arranged to encrypt the first query function is further constructed and arranged to replace the bit values of each entry of the first set of truth tables with a respective random binary string of a fixed length;
wherein the controlling circuitry constructed and arranged to encrypt the second query function is further constructed and arranged to replacing the bit values of each entry of the second set of truth tables with a respective random binary string of a fixed length; and
wherein the controlling circuitry constructed and arranged to encrypt the query input is further constructed and arranged to replace each of the bit values representing the query input with a respective random binary string of a fixed length.

15. An electronic system as in claim 14, wherein the controlling circuitry constructed and arranged to encrypt the first query function is further constructed and arranged to:
for each entry of a truth table of the first set of truth tables, perform a symmetric encryption operation on the possible values of the bit representing the first output, the symmetric encryption operation using, as keys, (i) the random binary string replacing the possible values of the bit representing the first garbled query data and (ii) the random binary string replacing the possible values of the bit representing the second garbled query data, and
rearrange an order of the entries of the truth table to produce a garbled truth table.

16. An electronic system as in claim 12, wherein a query data source of the set of query data sources decomposes the readable query data into first query data and second query data, a bitwise exclusive or operation applied to the first query data and the second query data producing the readable query data;
wherein the controlling circuitry constructed and arranged to decompose the query function into the first query function and the second query function is further constructed and arranged to:
generate a first bitwise exclusive or function that takes as input (i) the query input and (ii) the first query data and produces an output that, when garbled, is the first output, and
generate a second bitwise exclusive or function that takes as input (i) the output of the first query function and (ii) the second query data and produces the query result.

17. An electronic system as in claim 16, wherein the readable query data includes a list of identifiers, the query input includes a particular identifier, and the query function includes a test for equality between the particular identifier and each of the list of identifiers; and wherein the controlling circuitry constructed and arranged to decrypt the second output according to the common encryption/decryption scheme to form the query result is further constructed and arranged to:

perform a decryption operation on the second output to produce a binary string having a length equal to a number of identifiers in the list of identifiers, and perform a Boolean operation on the binary string to produce a Boolean result that is TRUE in response to the binary string having at least one 1 and that is FALSE in response to the binary string having all 0's.

18. A computer program product including a non-transitory, computer-readable storage medium which stores executable code, which when executed by a client computer, causes the client computer to perform a method of performing a query, the method comprising:

generating, by processing circuitry, garbled query logic from a query function and query input;

performing, by the processing circuitry, a set of exchanges with a set of server computers which process the garbled query logic with garbled query data that the set of server computers acquired from a set of query data sources that produced the garbled query data from readable query data, the set of server computers being obscured from deriving the query function and the query input from the garbled query logic, and the set of server computers being obscured from deriving the readable query data from the garbled query data; and obtaining, by the processing circuitry, a query result from the set of exchanges performed with the set of server computers, wherein the set of server computers includes a first server computer and a second server computer, wherein generating the garbled query logic from the query function and the query input includes decomposing the query function into a first query function and a second query function and encrypting the first query function, the second query function, and the query input according to a common encryption/decryption scheme to form, respectively, a garbled first query function, a garbled second query function, and a garbled Query input, and wherein performing the set of exchanges with the set of server computers includes (i) sending bits representing the garbled first query function and the garbled query input to the first server computer, (ii) receiving bits representing a first output from the first server computer, the first output produced by the first server computer upon inputting the bits representing the garbled query input and bits representing first garbled query data into the primary query function, and (iii) sending bits representing the garbled second query function and the bits representing the first output to the second server computer.

* * * * *